United States Patent [19]

Renner

[11] Patent Number: 4,873,886
[45] Date of Patent: Oct. 17, 1989

[54] ARMREST FOR BICYCLE HANDLEBAR

[76] Inventor: Rolf Renner, P. O. Box 1819, Healdsburg, Calif. 95448

[21] Appl. No.: 148,670

[22] Filed: Jan. 26, 1988

[51] Int. Cl.⁴ .............................................. B62K 21/12
[52] U.S. Cl. ................... 74/551.8; 248/230; 74/551.1
[58] Field of Search ............ 74/551.1–551.9, 74/489, 488; 280/279; D12/178; D8/303; 248/214, 230, 309.1

[56] References Cited

U.S. PATENT DOCUMENTS

| D. 129,391 | 9/1941 | Fischer | 74/551.8 X |
|---|---|---|---|
| 598,083 | 2/1898 | Gilbert | 74/551.1 X |
| 609,690 | 8/1898 | Mayerson | 74/551.8 |
| 2,133,010 | 10/1938 | Barry | 74/551.1 |
| 2,396,041 | 3/1946 | Du Pont | 74/551.2 |
| 2,491,609 | 12/1949 | George | 74/551.1 X |
| 3,307,710 | 3/1967 | Negri | 248/230 X |
| 3,760,648 | 9/1973 | Hoffman | 74/489 |
| 3,937,629 | 2/1976 | Hamasaka | 74/551.8 |
| 3,941,011 | 3/1976 | Kirk | 74/551.2 |
| 4,032,168 | 6/1977 | Emerson | 74/551.8 X |
| 4,250,770 | 2/1981 | Robertson | 74/551.1 X |

FOREIGN PATENT DOCUMENTS

| 1134458 | 1/1985 | U.S.S.R. | 74/551.1 |
|---|---|---|---|
| 10844 | 5/1895 | United Kingdom | 74/551.1 |
| 531716 | 1/1941 | United Kingdom | 74/551.2 |
| 741726 | 12/1955 | United Kingdom | 74/551.1 |

Primary Examiner—Vinh Luong

[57] ABSTRACT

A bicycle handlebar includes two pieces of tubing, a first piece bent forward into a U shape, which attaches to the handlebar stem, and a second straight piece, connecting the ends of the bent piece. Laterally adjustable arm rests may be added to the bent piece. An extension portion can be added to the straight piece to enable the rider to stretch out for the best aerodynamic riding position. Finally, a bracket may be added to the straight piece to enable mounting of down-tube style shift levers.

2 Claims, 2 Drawing Sheets

ARMREST FOR BICYCLE HANDLEBAR

FIELD OF THE INVENTION

This invention relates to a bicycle handlebar which is mounted on a bicycle handlebar stem.

BACKGROUND OF THE INVENTION

Handlebars for bicycles have been made in different shapes for different types of bicycles, with each type of handlebar having major disadvantages. For racing bicycles, there are turned down handlebars on which the rider has to support his upper body with his arms when riding in a low (racing position, which position is tiring when used for long periods. Upright handlebars give the rider only one hand position, which is tiring when used on long rides.

OBJECTS AND ADVANTAGES OF THE INVENTION

An object of the invention is to provide a handlebar for a bicycle that combines the advantages of aerodynamics and comfort, and which offers varied hand positions for the rider. The purpose of this improved handlebar design is to decrease the frontal area of the bike and rider by raising the handlebar, contrary to the previous practice of requiring low handlebars to decrease frontal area. The upper body of the rider is put into a low position by putting the rider's arms into a more horizontal position, and thus have the rider assume a position resembling the posture a swimmer takes when plunging into a pool. To achieve this position for the rider, the design of the handlebar moves the rider's hands further forward than with traditional handlebars. By comparing FIG. 4 (rider shown using traditional turned-down handlebars) with FIG. 5 (rider shown using the handlebar of this invention), it can be seen that the frontal area of the bike and rider has been decreased through the use of the inventive handlebar.

The handlebar of this invention preferably should be used with so-called all terrain bicycle handlebar stems, which allow the rider to raise or lower the handlebar for the best aerodynamic position. This improved handlebar also lets the rider sit more upright than can be done with turned-down type handlebars, by moving his hands to the rearward bar. By not having dropped ends, as with a turned-down style handlebar, the frontal area of the bike and rider is decreased. When the rider rests his arms on the armrest, his upper body is relaxed and his energy is conserved.

Another advantage of the invention is that it provides the rider with good hand holds while climbing hills. When climbing hills while sitting, the rider cna hold the forward bar and get good leverage. When climbing hills while standing on the pedals, the rider uses the parts of the bars which are parallel to the direction of travel. When the handlebar of this invention is mounted on an all terrain bicycle, a normal riding position can be adopted, and in addition the rider has the choice of different hand and body positions, making long rides less tiring. The rider can adopt an aerodynamic position while resting his arms on the armrest, or he can sit more upright by holding the rearward bar and resting his palms on the armrest. The rider can lower or raise his upper body without changing hand positions by resting his arms on the armrest or by raising his arms off the armrest, as shown in FIG. 6a (arms on armrest) and 6b (arms off armrest). The armrests can be moved laterally to fit different size riders and riding styles, and different purposes for the same rider. For example, the armrests may be moved further apart for touring and good leverage, or closer together for better aerodynamics. The shift lever bracket brings the shift levers within easy reach of the rider, and keeps the levers out of the air stream. In addition, the handlebar of the invention is in one plane, making the disassembled bike more compact for shipping than bikes with turned-down bars.

BRIEF DESCRIPTION OF THE DRAWINGS

FIG. 4a is a top view of a rider on a bike with dropped-down style handlebars, while

FIG. 5a is a top view of a rider on a bike using the handlebar of this invention, with his hands on the handlebar extension and his arms on the handlebar armrest, while

DETAILED DESCRIPTION OF A PREFERRED EMBODIMENT

Figure 1:
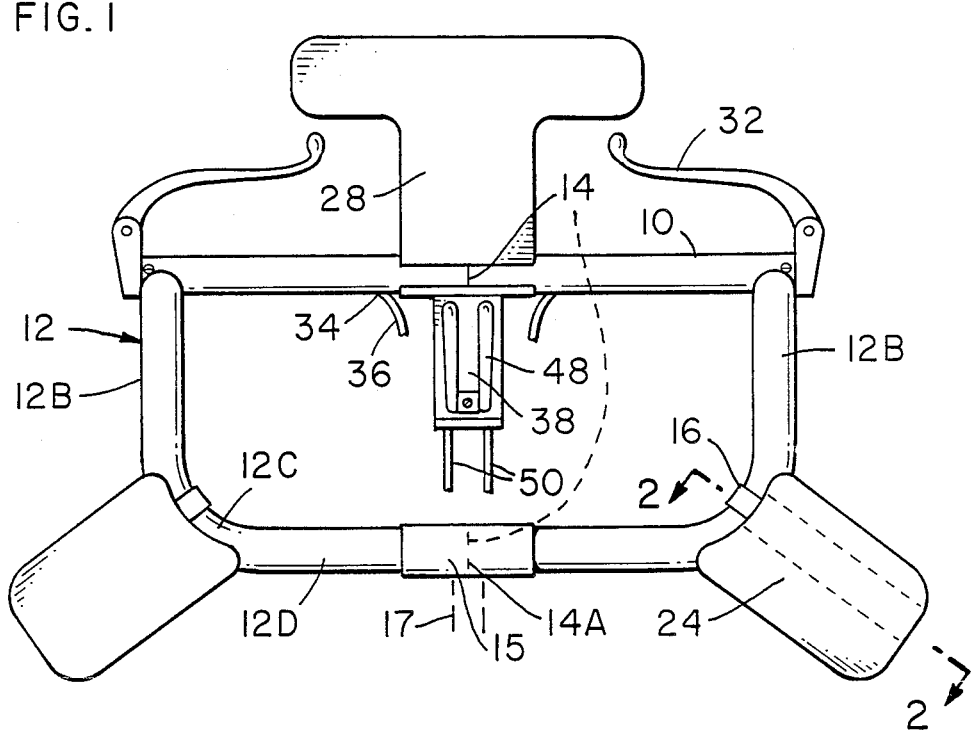
FIG. 1 is a plan view of the aerodynamic bicycle handlebar of this invention, with shift and brake levers shown mounted thereon.
Figure 3:
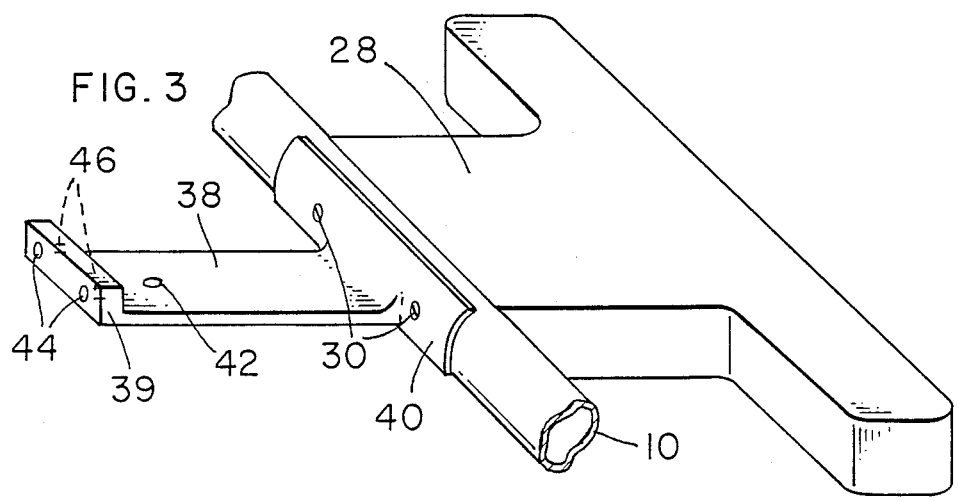
FIG. 3 is an isometric view of the shift lever bracket, forward bar and extension of the handlebar.
Figure 4A:
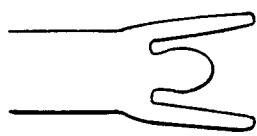
Figure 5A:
Figure 4B:
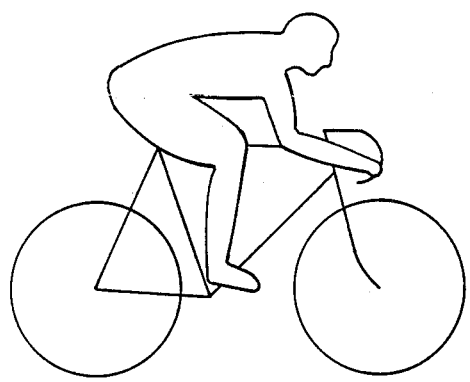
FIG. 4b shows the same subject in side view.
Figure 5B:
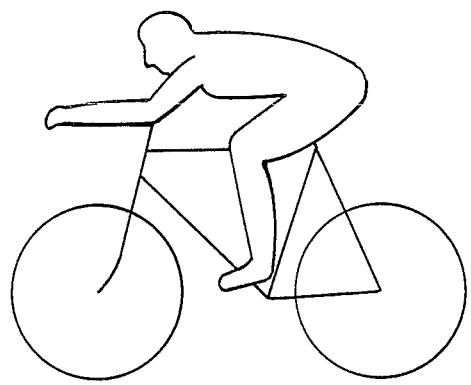
FIG. 5b shows the same subject in side view.
Figure 6A:
FIG. 6a is a side view of a rider using the handlebar of this invention while holding the forward bar with his arms on the armrest.
Figure 6B:
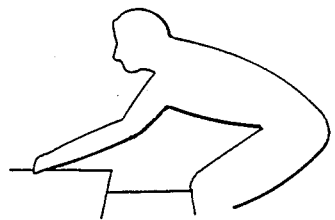
FIG. 6b is a side view of a rider using the same hand position as shown in FIG. 6a, but with his arms off of the armrest.

FIG. 1 shows an overall view of rectangular handlebar of this invention, consisting of tubing bent into a U-shaped piece 12 comprising side bar portions 12b, bent sectios 12c, and rearward bar 12d, and closed with an open ended straight piece 10. The straight piece 10 is the forward bar and has reverse brake levers 32 installed thereon. The forward bar 10 has two slots 34 for the exit of brake cables 36. The handlebar can be made in one piece for break-away handlebar stems, or it can be made in two sections as shown for use with one piece stems. One joint 14 is in the center of the forward bar 10, while the other joint 14a is in the center of rearward bar 12d and is covered by a lengthwise slit sleeve 15, which attaches to handlebar stem 17, shown in phantom. A T-shaped extension 28 may be added to forward bar 10. The extension 28 is attached to forward bar 10 by two bolts 30 (FIG. 3). The same bolts 30 may be used to hold a shift lever bracket 38 to forward bar 10. The shift lever bracket 38 shown in FIG. 3 is made of a piece of rigid material. The forward end 40 of this bracket is wider than the rest of the bracket, and is angled upward and is concave to the outside so as to fit against forward bar 10. The rearward end of this bracket 38 has a raised section 39 which includes two holes 46 for passage of derailleur cables, and recesses 44 around holes 46 on the rearward side for derailleur cable housing 50 to fit into. A hole 42 is near the rearward end of bracket 38 for receiving a bolt which will hold shift levers 48.

Figure 2:
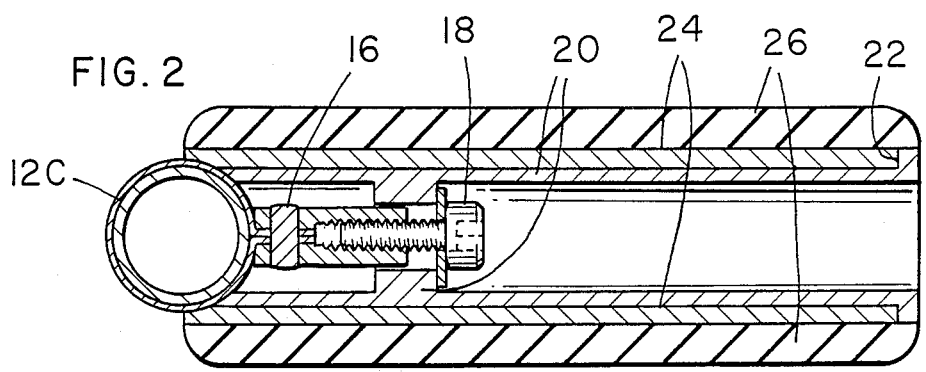
FIG. 2 is a cross-sectinal view of the armrest of the handlebar, this view taken along line 2—2 of FIG. 1.

FIG. 2 shows a tubular hand grip 20, one end of which is held to the bent section 12c by a band clamp 16 and a bolt 18. The other end of the handgrip has a flange 22 either screwed or welded onto it to hold armrest 24 against bent sectio 12c. Armrest 24 has a hole through it so it can be slipped over the handgrip. One end of armrest 24 is concave in shape to fit agaist bent section 12c. The concave end of armrest 24 and clamp end of handgrip 20 are made a few degrees off perpendicular so that their angle of attachment to bent section 12c can be changed by turning them 180 degrees. The top of armrest 24 is covered with foam 26.

Thus, the handlebar of the invention provides an aerodynamic and comfortable device which can be made more versatile by adding a front extension, handgrips and armrests. While the above description contains many details, these should not be construed as limitations on the scope of the invention, but rather as an exemplification of one preferred embodiment thereof. Many other variations are possible. For example, the tubing in the handlebar can be ovalized to make it more aerodynamic. The tubing may be made with a V-groove, and the band clamp made with a seam to fit into this groove, so that the handgrip will be more secure under adverse conditions. Instead of the handgrip and armrest shown, a shelf can be welded onto the handlebar and covered with foam. Accordingly, the scope of the invention should be determined not by the embodiments illustrated, but by the appended claims and their legal equivalents.

I claim:

1. A handlebar for mounting to a bicycle having a handlebar stem, said handlebar comprising:
    a bent tubing portion forming a U-shape and terminating in two ends, said bent tubing portion including a pair of curved sections adjacent a central section, said central section conditioned for attachment to said bicycle handlebar stem;
    a straight tubing portion connecting said bent tubing portion ends; and
    a pair of armrest portions connected to said bent tubing portion curved sections wherein said armrest portions each comprise a generally rectangular armrest bearing a concave side for placement against said curved section, and a central hole, and further comprising a tubular handgrip for insertion into said central hole, said handgrip including clamping means for attachment to said bent tubing portion curved sections, and further including a flange portion for capture of said armrest.

2. The handlebar of claim 1 whrein said straight tubing portion includes a forward extension portion conditioned for grasping by a rider's hands.

* * * * *